Aug. 19, 1952     L. C. BROWN     2,607,697
METHOD OF COLORING AND PACKAGING MARGARINE
AND COLORING COMPOSITION THEREFOR
Filed May 19, 1948
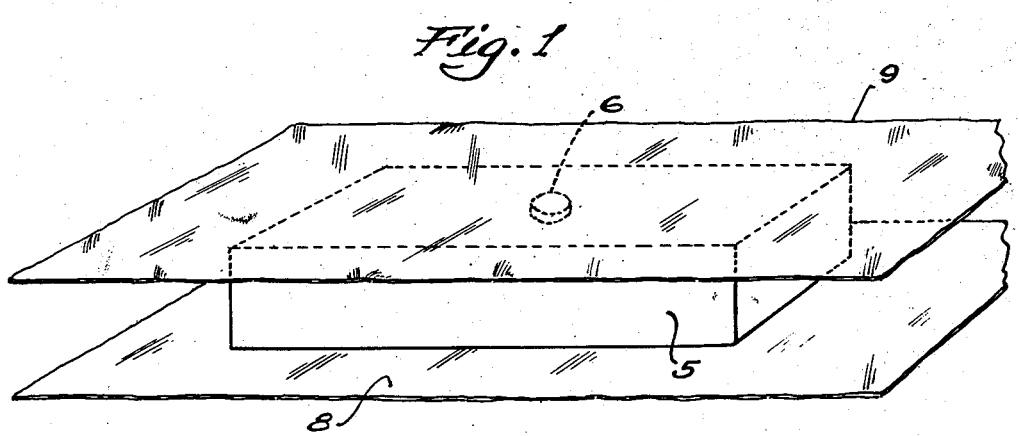
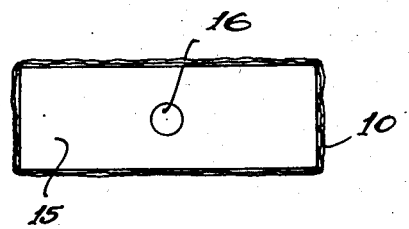
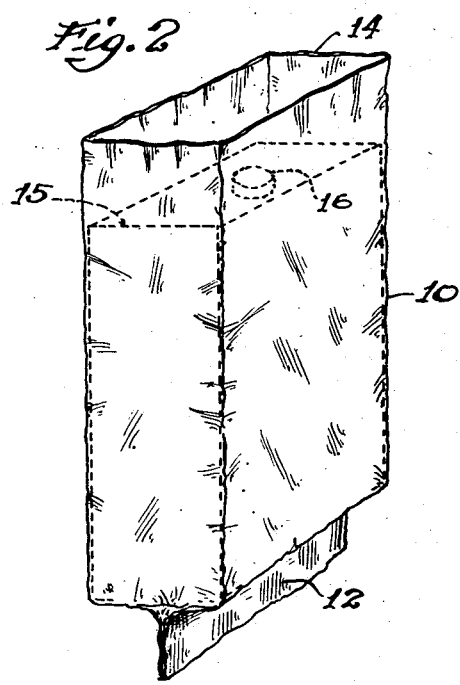
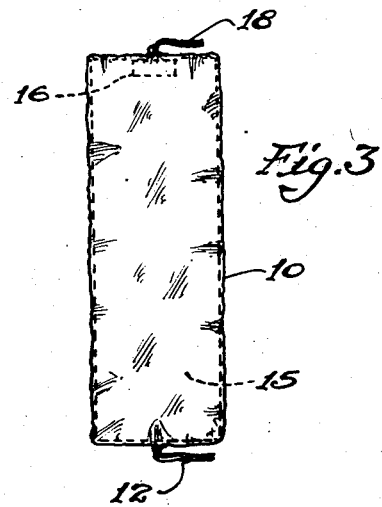
INVENTOR.
Leo C. Brown
BY
R.G. Story
ATTORNEY Patented Aug. 19, 1952

2,607,697

UNITED STATES PATENT OFFICE 2,607,697

METHOD OF COLORING AND PACKAGING MARGARINE AND COLORING COMPOSITION THEREFOR

Leo C. Brown, Chicago, Ill., assignor to Swift & Company, Chicago, Ill., a corporation of Illinois Application May 19, 1948, Serial No. 27,986

11 Claims. (Cl. 99—179)

This invention relates to a method and means for coloring and packaging margarine and similar materials. The invention has to do particularly with a package wherein the margarine and coloring material are enclosed in a flexible container whereby the coloring may be mixed with the margarine by simply kneading the package.

It has been proposed heretofore to color margarine by placing the margarine and the coloring material in a bag or container which is made of a flexible film of plastic material, and then kneading the package to distribute the coloring in the margarine.

For example, in the Boehm Patent No. 2,107,851, February 8, 1938, there is disclosed a method of coloring margarine and similar materials by introducing a premolded body of margarine and coloring material into an empty bag or flexible wall container having an open throat, then closing the throat by a string or by grasping with the hand, and finally kneading the bag to work the coloring material into the margarine.

In the Peters Patent No. 2,347,640, May 2, 1944, there is disclosed a margarine package comprising a sealed, flexible container in which is enclosed the margarine and the coloring material, the coloring material being separated from the margarine by a fold in the wrapper. In the latter type of package, the margarine is colored by working the container to release the coloring material from the fold and then kneading the container to mix the coloring material with the margarine.

Heretofore, in coloring margarine by kneading the coloring material and the margarine in a flexible bag, an oil-soluble dye has been used. This type of dye readily diffuses in the margarine merely upon contact therewith. Margarine is a water-in-fat emulsion and contains a large proportion of fat; for example, at least eighty per cent fat. In such an emulsion the fat is the exterior phase, and the fat-soluble coloring material immediately dissolves in the exposed fat phase of the emulsion when the coloring material contacts the margarine. It has been necessary, therefore, with the flexible bag-type packages of the prior art to keep the coloring material and the margarine separated until it is desired to color the margarine.

The flexible type of bag has been proposed for coloring margarine for the purpose of simplifying the coloring of the margarine. It has been customary to color margarine by placing the print of margarine in a bowl, adding the coloring material, and mixing the margarine and coloring material with a machine or by hand. The mixing operation is greatly simplified by the use of a flexible bag, since no implements or dishes are required and there is less opportunity for soiling the hands with the margarine or the coloring material. In the mixing operation using the flexible bag, it is unnecessary to contact the margarine with mixing apparatus or with the hands, thereby eliminating possible contamination and reducing loss as a result of the margarine clinging to dishes, utensils, and so forth, employed. In commercial operations there is advantage in providing a unit package in which both the margarine and the coloring material are enclosed in a preformed container, which is preferably in the form of an airtight enclosure. With such a consumer package, the housewife can readily color the margarine by merely kneading the package until the coloring material is uniformly distributed through the margarine.

The packages of the prior art wherein the coloring material is soluble in the oil phase have the disadvantage that the coloring material must be spaced apart from the margarine to prevent any possibility of the coloring material contacting the margarine until it is desired to color the product. The method of spacing the coloring material apart from the margarine by a fold in the package is restricted to the use of solid coloring material, and even then there is a tendency for the margarine to creep around the folds and cause leakage of the coloring material. Also, in order to be reasonably sure that the fold will not become loose and free the coloring material, the structure of the fold is often such as to cause difficulty in releasing the coloring material when it is desired to perform the mixing operation. Liquid coloring materials are sometimes desirable, and when such materials are used, the coloring agent is often enclosed within a smaller container, such as a gelatin capsule. In order to release the coloring material, it is necessary for the housewife to break the capsule by pinching, which may be difficult to do and may cause perforation of the flexible package. Furthermore, in order to avoid the capsule becoming lost in the body of the margarine, it is necessary to provide a perforated receptacle which will retain the capsule but allow free passage of the coloring material into the margarine when the capsule is broken. Moreover, a package wherein the coloring material is spaced apart from the margarine requires special construction which adds expense to the consumer.

An object of the present invention is to provide a method of coloring margarine in a flexible container wherein the margarine and the coloring material are mixed by kneading the bag, and wherein it is unnecessary to maintain the coloring material spaced apart from the margarine prior to the kneading operation.

A further object of the invention is to provide a method for coloring margarine wherein the margarine and the coloring material are kneaded in a flexible container and the coloring material is dispersed substantially in the water phase.

Also an object of the invention is to provide a package comprising a flexible container, preferably heat sealed, in which the margarine and the coloring material are enclosed, said coloring material being in direct contact with the margarine.

In accordance with the present invention, the coloring agent may be placed in direct contact with the margarine if the proper material is selected. It has been found that it is unnecessary to use the conventional fat-soluble coloring material in order to successfully color margarine. For example, margarine may be successfully colored by dispersing the coloring material in the water phase. In the water-in-fat emulsion, the particles of water in the emulsion are protected or surrounded by a film of fat. Accordingly, the water-soluble coloring material may be contacted with the solidified margarine emulsion without the coloring material coming in contact with the water phase. I have found, therefore, that by selecting a coloring material which is substantially insoluble in the fat phase, and preferentially soluble, or at least readily dispersible, in the water phase, such coloring material may be placed in direct contact with the margarine without any apparent coloring of the margarine taking place. It has further been discovered that such coloring material may be readily dispersed in the margarine by working the margarine and the coloring material, such as by kneading, as contemplated in the present invention.

In selecting the water-soluble coloring agent, certain principles must be observed in order to produce a product which can be sold as uncolored margarine as the bulk of the margarine is sold today. The coloring material must be one that will not diffuse or dissolve in the margarine when the coloring material is placed in direct contact with the margarine. Also, the coloring material must be palatable and impart to the colored margarine a tint which is acceptable to the consumer. Dyes which I have found to meet these requirements when used in the proper amounts, alone or in mixture, include the following:

A. Coal tar dyes, such as:
Food, Drug & Cosmetic Certified Dye Yellow #1 which is the disodium salt of 2-4-dinitro-1-naphthol-7-sulfonic acid.
Food, Drug & Cosmetic Certified Dye Yellow #2 which is the dipotassium salt of 2-4-dinitro-1-naphthol-7-sulfonic acid.
Food, Drug & Cosmetic Certified Dye Yellow #5, commonly known as "Tartrazine," which is the trisodium salt of 3-carboxy-5-hydroxy-1-p-sulfophenyl-4-p-sulfophenylazopyrazole.
Food, Drug & Cosmetic Certified Dye Yellow #6, commonly known as "Sunset Yellow FCF," which is a disodium sale of 1-p-sulfophenylazo-2-naphthol-6-sulphonic acid.

B. Vegetable dyes, such as:
Annatto, a commercial water-soluble preparation such as used in the coloring of cheese.
Saffron—water soluble form.
Safflower—water soluble form.

The dyes may be used in various forms, such as a solid composition or a liquid solution. It is preferable to use them as a solid composition because of ease of handling, ease of placing the coloring on the margarine, and improved appearance of the package. When using a solid composition, it is desirable to compound the dye with certain other materials. A carrier material is usually necessary in order to impart the required physical properties so that the material can be shaped into rigid forms, such as pellets. Also, the carrier serves as a diluent which enables more accurate measuring of the desired quantity of dye, particularly in the cases of very concentrated dyes. Solid inert carriers have been found to be satisfactory for this purpose. It is often advantageous to use with this type of carrier a material which will impart structural strength to the solid material when pelleted and will prevent disintegration or crumbling of the pellet in handling and when exposed to atmospheres of high humidity such as a substantially saturated atmosphere as occurs in a sealed bag of margarine.

Instead of the foregoing carrier materials which are substantially inert, water-imbibing agents may be used to absorb the dye solutions and convert the mixture into a plastic form which may be pelleted. A suitable water-imbibing agent may also function as a dispersing agent to facilitate the distribution of the coloring material throughout the margarine.

In forming the coloring material into a solid composition, various procedures may be used. The coloring material compounded with the necessary ingredients to produce a proper composition may be cut into small cylinders or rolled into a sheet from which wafers of desired size may be cut, stamped, or pressed in a suitable machine as pellets. It has been found that if the proper ingredients are incorporated into the pellet, the pellet will retain its structural form when in contact with the margarine and in a sealed bag without disintegration or staining of the surface of the margarine.

When using dyes as a liquid composition, it is usually necessary to inject the solution into the interior of the body of the margarine in order to make it stay in place. Examples of suitable solvents are water, glycerine and propylene glycol, and the like.

More particularly, I have found that suitable water-soluble colors for the purpose of carrying out the invention are blends of Tartrazine (Food, Drug & Cosmetic Certified Dye Yellow # 5) with Sunset Yellow FCF (Food, Drug & Cosmetic Certified Dye Yellow #6) in the proper proportions, which I have found to be about 4 parts of FD&C #5 to 1 part of FD&C #6. I have also found that certain water-soluble or water-dispersible forms of vegetable colors, such as Annatto, Saffron, Safflower, etc., are suitable for the purpose either singularly, blended with each other, or blended with the coal tar dyes, such as FD&C #1, #2, #5, and #6.

The materials suitable as solid carriers are various forms of starch, such as tapioca, corn starch, rye flour, wheat flour, and so on; powdered sugar; powdered salt; or combinations of these ingredients. When these materials are used as carriers, the coloring agents are placed in solutions of water, glycerine, or similar material and mixed with the dry ingredients until a dough-like composition is prepared. Small wafers are then cut or formed by pressurizing, and these wafers can then be placed in direct contact with the margarine to be colored without diffusion of the color. Another ingredient of these wafers which I found to be desirable to impart structural strength is sodium carboxymethyl cellulose, which prevents disintegration or complete disintegration of the wafer when exposed to a saturated atmosphere, such as found in a sealed bag of margarine. Other materials which could serve the same purpose as the sodium carboxymethyl cellulose are the water-absorbing gums, such as gum tragacanth, gum karaya, locust bean gum, and the like.

It is also sometimes advantageous to mix with the dry carrier materials a small amount of a plasticized fat, such as a commercial shortening. This promotes plasticity of the material, rendering it more adaptable to pelleting, etc., and also promotes easier and smoother mixing with the margarine. Examples of such plasticized fats are hydrogenated cottonseed oil and hydrogenated soybean oil or any other vegetable or animal fat of melting point of at least about 100° F., and preferably around 110°–125° F., for example, about 120° F.

Other carriers which may be used in the invention are water-imbibing or emulsifying agents adapted to absorb the dye solution and convert the mixture into a plastic mass. Examples of these agents are the fatty acid esters of polyoxyalkylene derivatives of sorbital. There are many of these types of compounds capable of being prepared and capable of being used. One such compound which seems particularly advantageous is monostearic acid ester of a polyoxyalkylene derivative of sorbital in which each of the hydroxyl groups of the sorbital is reacted with one or two mols of ethylene oxide. Another emulsifying agent suitable for carrying out the method as described is the polyoxyalkylene derivative of stearic acid. Another type of emulsifier suitable for the method is the fatty acid ester of polymerized glycerol. Still another emulsifier having suitable qualities is one in which lecithin is blended with mono fatty acid esters of glycerine.

The following examples will serve to illustrate the manner in which the invention may be practiced, but the invention is not limited to the specific examples given.

*Example I*

A dye emulsion was prepared by dissolving 0.8 gram of FD&C Certified Dye Yellow #5 and 0.2 gram of FD&C Certified Dye Yellow #6 in 9 grams of water and emulsifying the resulting solution with 10 grams of melted polyoxyalkylene stearate. The polyoxyalkylene stearate serves as a water-imbibing agent so that the mixture may be pelleted, and also serves as a reagent for rendering more readily dispersible the dye in margarine. The resulting product was a plastic solid having a melting point well in excess of that of margarine. The resulting product was formed into half gram pellets by forming in a starch mold. A one-pound package of margarine was formed by filling the margarine directly into a polyethylene film bag. The aforesaid pellet was laid directly on top of the margarine at the open end of the bag, and the bag was then heat sealed. No apparent coloring of the margarine occurred. When it was desired to color the margarine, a portion of the margarine in the bag was thoroughly mixed with the color pellet by manipulation. When this portion was sufficiently colored, it was forced into the remainder of the margarine in the bag and colored throughout by manipulation or kneading.

The letters "FD&C" in the above example represent "Food, Drug & Cosmetic." The above identification of the dyes is in accordance with the regulations promulgated under the authority of the Federal Food, Drug & Cosmetic Act of 1938 and as published by the Federal Security Agent, Food & Drug Administration, Service and Regulatory Announcements, Food, Drug & Cosmetic #3, issued September, 1940, under the title "Cold Tar Color Regulations."

*Example II*

A solution was prepared by dissolving 4.9 grams of FD&C Yellow #5 and 1.7 grams of FD&C Yellow #6 in 93.4 grams of chemically-pure glycerine. A 19-gram sample of the resulting mixture was mixed with 15 grams of powdered salt, 30 grams of powdered sugar, 32 grams of tapioca flour, and 4 grams of sodium carboxymethyl cellulose, until a dough-like preparation was obtained. The product was pelleted in a conventional pelleting machine to produce 1-gram pellets containing sufficient dye to tint a one-pound sample of margarine. The pellet was placed in a one-pound bag of margarine as in Example I. The margarine in the resulting package showed no signs of becoming colored until the package was kneaded.

*Example III*

A solution was prepared by dissolving 0.8 gram of FD&C Yellow #5 and 0.2 gram of FD&C Yellow #6 in 9 grams of water. A 0.25 cc. sample of this solution was injected, by means of a suitable injection needle and syringe, into the body of one pound of margarine contained in a flexible-wall bag, the bag then heat sealed. The coloring remained unmixed with the margarine until the contents of the bag were kneaded. A ready dispersion of the color was obtained, together with a desirable tint to the finished product by simply kneading the package.

*Example IV*

A glycerine solution of dye was prepared by dissolving 10.0 grams of FD&C #5 and 1.5 grams of FD&C #6 in 60 grams hot glycerine. After cooling, 27.3 parts of this solution were mixed with 52.6 parts tapioca flour, 16.3 parts powdered sugar, and 4.0 parts sodium carboxymethyl cellulose. After mixing to a plastic dough, 10 parts plastic shortening consisting of hydrogenated vegetable oils of about 120° F. melting point were added and thoroughly blended. When this material was rolled into a sheet, pellets of ½ gram size were readily cut. These pellets when placed in direct contact with the margarine in a bag of one pound capacity showed no evidence of diffusion on standing, yet colored the margarine smoothly and readily when the sealed bag was manipulated by kneading.

The manner of enclosing the margarine and the coloring material in the bag is subject to considerable variation. Instead of laying the pellet of coloring material on the margarine as indicated above, the pellet may be sunk into the margarine so that the top of the pellet is substantially flush with the surface of the margarine. It is desirable that the pellet be visible through the container for purposes of mixing the coloring with the margarine, since it is often desirable to first work the coloring material into a small amount of the margarine before coloring the bulk of the margarine. The coloring material may be placed at one or both of the ends, or at one or more sides of the margarine. It is, of course, possible that the coloring material may be imbedded in the margarine so that it will not be visible.

The bag or flexible container is preferably transparent, waterproof, and of sufficient strength to withstand the kneading action encountered in coloring the margarine. It is advantageous to use a thermoplastic material so that it may be heat sealed to form a substantially airtight container. Materials which have been found suitable are polyethylene films, polymerized rubber hydrochloride films, thermoplastic regenerated cellulose, polyvinyl films, or combinations of these.

The package may be formed by charging the margarine and coloring material into a bag and then heat sealing the open end of the bag. Instead of using preformed bags, the container may be formed around the body of the margarine to which the coloring material has been applied. For example, the margarine and the coloring material may be placed on a sheet of thermoplastic material which is then folded around the body of the margarine and the edges heat sealed. In some cases it may be desirable to use two sheets of plastic material, one below and one above the body of the margarine, and then heat seal the edges of the sheets.

In the accompanying drawings:

Figure 1 is a perspective view of a print of margarine and a pellet of coloring material positioned between two sheets of plastic film which is adapted to be heat sealed around the edges.

Figure 2 is a perspective view of an open-end bag of flexible material containing the margarine and coloring material.

Figure 3 is a side elevational view of the same package as in Figure 2 after the open end has been heat sealed.

Figure 4 is a top end view of the package of Figure 2.

Referring to Figure 1, numeral 5 represents a print of margarine on which is spotted a pellet of coloring material 6. The print of margarine is positioned on a sheet of plastic film 8. A second sheet of plastic film 9, simultaneously with the lower sheet or in proper sequence, is placed on top of the print of margarine. The edges of the sheet are thereafter heat sealed by any well-known or preferred type of mechanical equipment to form an airtight container around the margarine.

Instead of forming a container around the body of margarine, a preformed bag may be used, as shown in Figures 2, 3, and 4. As shown in Figure 2, the bag may take the form of a segment of tubing 10 which is heat sealed at one end 12 and open at the other end 14. The margarine 15, preferably in a plastic form, is charged into the bag through the open end. A coloring pellet 16 is then laid on top of the body of the margarine. The open end of the bag is then heat sealed, as shown at 18 in Figure 3.

The methods of enclosing the margarine and coloring material in a heat-sealed bag shown in Figures 1 to 4 are merely illustrative, as other types of bags may be used and the manner of formnig the same may be varied. In commercial operations, the packaging operation is advantageously carried out continuously; thus, suitable automatic and semi-automatic equipment for enclosing the margarine and coloring material in the container and for heat sealing the container may be used.

The invention has an advantage in that the coloring material is not spaced apart from the margarine. This provides greater ease of coloring, since it is only necessary to knead the package to disperse the color which is in contact with the margarine; whereas some inconvenience is encountered by breaking capsules, unfolding a portion of the bag, and so forth, to obtain contact of the coloring with the margarine in the cases where the coloring is spaced apart from the margarine. The danger of tearing the container through the necessity of pinching a capsule of color is also eliminated according to the present invention. In addition, the appearance of the margarine package is enhanced by the presence of the coloring pellet. Also, it is unnecessary, according to the present invention, to use capsules or other containers for the coloring material whereby the presence of the empty containers in the margarine package, after coloring, is eliminated.

It has further been observed that the color of the margarine when colored with the water-soluble dyes is more attractive than when it is colored with the conventional oil-soluble dyes. It is believed that this increase in attractiveness is due to the color being dispersed in the water phase that is covered with thin films of fat through which the color must be observed. This seems to diminish the brilliance of the color, thereby causing the colored product to appear less shiny and less greasy.

Obviously, many modifications and variations of the invention, as hereinbefore set forth, may be made without departing from the spirit and scope thereof, and therefore only such limitations should be imposed as are indicated in the appended claims.

I claim:

1. A process for packaging margarine, which comprises: forming a body of margarine, forming a body of coloring material, placing the body of coloring material in contact with said margarine at least a portion of the active coloring ingredient of said coloring material being in direct contact with said margarine, said active coloring ingredient being water soluble but prevented from dissolving in the water phase of the margarine by the oil phase, whereby the coloring material remains undispersed into the margarine until the package is worked, and enclosing the margarine and coloring material in a flexible container.

2. A process for packaging margarine, which comprises: introducing the margarine into a flexible container, placing in contact with said margarine a small body of coloring material at least a portion of the active coloring ingredient of said coloring material being in direct contact with said margarine, said active coloring ingredient being water soluble and substantially fat insoluble but prevented from dissolving in the water phase of the margarine by the oil phase, whereby the coloring material remains undispersed in said margarine until the package is worked, and then closing said container.

3. A process for packaging margarine, which comprises: enclosing the margarine and a pellet of coloring material in a flexible container, at least a portion of the active coloring ingredient of said pellet being in direct contact with the margarine, said active coloring ingredient being water soluble and substantially fat insoluble but prevented from dissolving in the water phase of the margarine by the oil phase, whereby the coloring material remains undispersed in said margarine until the package is worked, and heat sealing said package.

4. A method of incorporating into margarine coloring material which is to be subsequently dispersed in the margarine, which comprises: imbedding a quantity of water-soluble coloring material in the margarine, at least a portion of the active coloring ingredient of said coloring material being in direct contact with the margarine but prevented from diffusing into the water phase of the margarine until the margarine is worked by a protective film of the fatty phase of the margarine.

5. A method of packaging margarine and coloring agent therefor, which comprises: imbedding a quantity of water-soluble coloring material in the margarine whereby at least a portion of the coloring material is visible at the surface of the margarine, at least a portion of the active coloring ingredient of said water-soluble coloring material being in direct contact with the margarine but prevented from diffusing in the margarine by an impermeable wall of the fat phase of the margarine, and enclosing the margarine and coloring material in a flexible container in which the margarine may be worked to diffuse the coloring material in the margarine.

6. A composition for coloring margarine, comprising a mixture of a glycerine solution of the trisodium salt of 3-carboxy-5-hydroxy-1-p-sulfophenyl-4-p-sulfophenylazopyrazole and the disodium salt of 1-p-sulfophenylazo-2-naphthol-6-sulphonic acid, tapioca flour, sugar, carboxy methyl cellulose, and shortening.

7. A composition for coloring margarine comprising a solution of a trisodium salt of 3-carboxy - 5 - hydroxy - 1 - p - sulfophenyl - 4 - p-sulfophenylazopyrazole and the disodium salt of 1-p-sulfophenylazo-2-naphthol-6-sulphonic acid in a solvent and a plasticized fat.

8. A composition for coloring margarine comprising a solution of about 4 parts of the trisodium salt of 3-carboxy-5-hydroxy-1-p-sulfophenyl-4-p-sulfophenylazopyrazole and 1 part of disodium salt of 1-p-sulfophenylazo-2-naphthol-6-sulphonic acid in a solvent and a hydrogenated fat.

9. A margarine coloring composition which may be placed in direct contact with the margarine and remain undispersed in the margarine until the margarine and coloring unit are worked, comprising essentially a solution of a water-soluble dye emulsified with a plasticized fat, said composition being entirely dispersible in the margarine.

10. A margarine coloring unit which may be placed in direct contact with the margarine and remain undispersed in the margarine until the margarine and the coloring unit are worked, comprising a mixture of essentially a solution of a water-soluble dye, a dry carrier material dispersible in water, and a plasticized fat, said mixture being formed into a unit mass and being entirely dispersible in the margarine.

11. A margarine coloring unit which may be placed in direct contact with the margarine and remain undispersed in the margarine until the margarine and the coloring unit are worked, comprising essentially a mixture of a dry carrier material dispersible in water and a solution of a water-soluble dye, said mixture being formed into a unit mass and being entirely dispersible in the margarine.

LEO C. BROWN.

REFERENCES CITED

The following references are of record in the file of this patent:

UNITED STATES PATENTS

| Number | Name | Date |
|---|---|---|
| 1,919,025 | Jones et al. | July 18, 1933 |
| 1,986,783 | Adler | Jan. 8, 1935 |
| 2,052,175 | Haurand | Aug. 25, 1936 |
| 2,107,851 | Boehm | Feb. 8, 1938 |
| 2,347,640 | Peters | May 2, 1944 |
| 2,454,420 | Adler et al. | Nov. 23, 1948 |
| 2,502,920 | Brown | Apr. 4, 1950 |

OTHER REFERENCES

"Separation and Identification of Food Coloring Substances," U. S. Dept. of Agriculture, Bulletin No. 448, February 15, 1917.